May 1, 1923.

J. N. McHUGH

AUTO LOCK

Filed April 5, 1921

1,453,882

Inventor

J.N.McHugh.

By C.A.Snow & Co.

Attorney

Patented May 1, 1923.

1,453,882

UNITED STATES PATENT OFFICE.

JAMES N. McHUGH, OF LEXINGTON, ILLINOIS.

AUTO LOCK.

Application filed April 5, 1921. Serial No. 458,709.

*To all whom it may concern:*

Be it known that I, JAMES N. McHUGH, a citizen of the United States, residing at Lexington, in the county of McLean and State of Illinois, have invented a new and useful Auto Lock, of which the following is a specification.

This invention relates to motor vehicle locks, and more particularly to a lock designed to be attached to the vehicle wheel to prevent movement of the vehicle supplied therewith, by unauthorized persons.

A further object of the invention is to provide a device of this character having means adapted to contact with the motor vehicle chassis to prevent rotation of the wheel.

A still further object of the invention is the provision of a device which may be readily and easily applied to a vehicle wheel, and one which will require comparatively small space for carrying.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
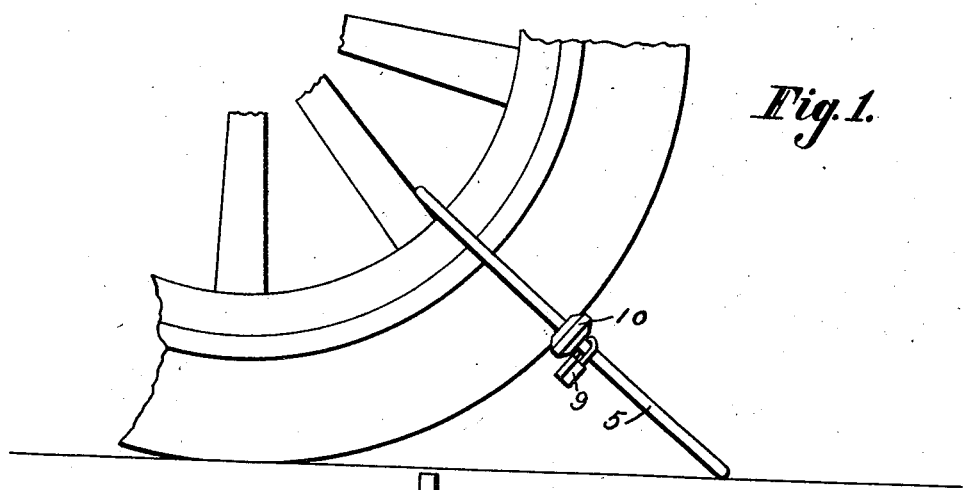
Figure 1 is a fragmental elevational view of a wheel showing the device as applied thereto.
Figure 2:
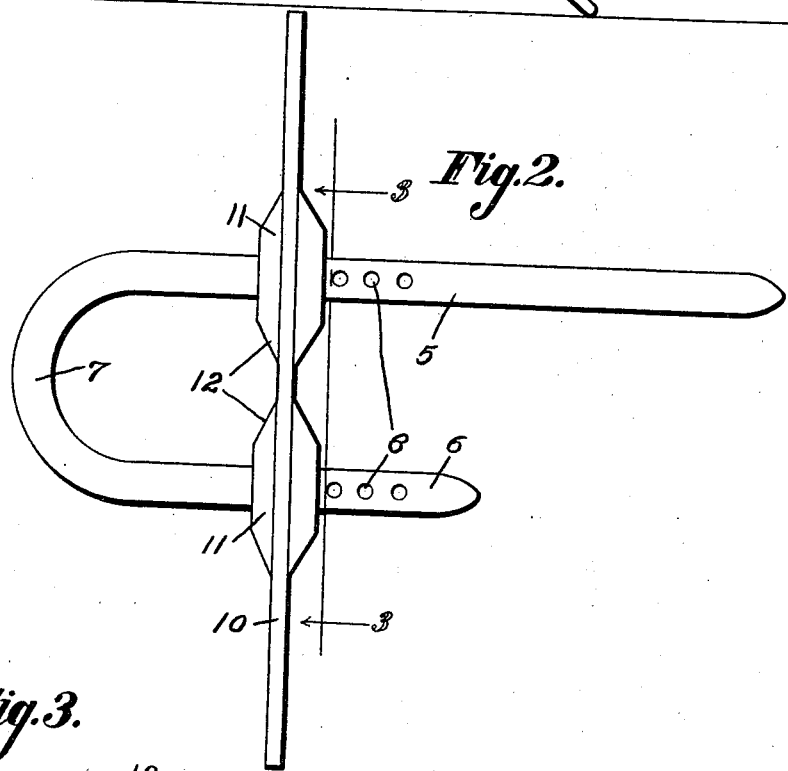
Figure 2 is a plan view of the lock.
Figure 3:
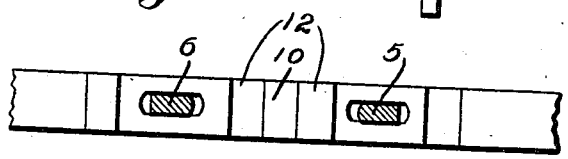
Figure 3 is a sectional view taken on line 3—3 of Figure 2.

Referring to the drawing in detail, the device is formed preferably by bending a bar at a point substantially intermediate its ends to provide opposed arms 5 and 6, which are connected by the curved portion 7 which is designed to conform to the curvature of the inner surface of a felloe or a rim.

The arms 5 and 6 are spaced apart a suitable distance to permit the device to be positioned over a rim and its tire in a manner to prevent twisting of the lock with respect to the wheel on which the same is positioned.

The arm 5 is relatively long as compared with the arm 6, so that when the device is applied to a wheel and the wheel is rotated to cause the arms to contact with the ground surface, the arm 5 will contact with the ground surface in advance of the arm 6, to impart a twisting movement to the wheel supplied with the lock, and since the lock is applied to the front wheel, by preference, the front wheel will be guided laterally and prevent the proper steering of the vehicle.

Formed in the arms 5 and 6 are a plurality of openings 8 to accommodate the shackles of the usual padlocks, the padlocks being indicated by the reference character 9.

The lock also includes a transverse bar 10 which is provided with enlargements 11 formed intermediate its ends, there being provided openings extending through the arm 10 and the enlargements to receive the arms 5 and 6 of the lock, the lateral extensions forming a part of the arm 10 providing hand-holds.

The bar 10 is relatively long, the ends thereof extending beyond the arms 5 and 6, terminating at points where the same will contact with the chassis of the vehicle, upon rotation of the wheel supplied therewith, and prevent rotation of the wheel beyond a predetermined point.

In the use of the device, the transverse bar 10 is removed from the arms 5 and 6, and the device is then placed over a wheel of a motor vehicle, so that the ends thereof extend outwardly from the wheel to contact with the ground surface should the wheel be rotated in one direction. The transverse bar is now positioned over the arms 5 and 6 and moved to a position in contact with the tire of the wheel, whereupon the padlocks 9 may be applied to the arms, as described, to prevent movement of the transverse bar with respect to the arms.

It might be further stated however that the enlargements 11 have tapered ends 12 which conform to the curvature of the tread of a tire to prevent injury to the tire, should the vehicle be started while the lock is in position.

Having thus described the invention, what is claimed as new is:—

A lock for wheels including a body portion, said body portion comprising a length of metal bent intermediate its ends to provide a relatively long arm and a short arm, the arms being provided with spaced openings, a movable arm having enlargements formed thereon, said enlargements being provided with openings to accommodate the first mentioned arms, said enlargements having tapered extremities, said movable arm having lateral extensions extending an appreciable distance beyond the side edges of the first mentioned arms, said lateral extensions forming hand-holds.

In testimony that I claim the foregoing as my own, I have hereto affixed my signature in the presence of two witnesses.

JAMES N. McHUGH.

Witnesses:
 JOHN ASHABRAN,
 WM. N. McNAUGHT.